(12) United States Patent
Chen

(10) Patent No.: US 12,310,335 B1
(45) Date of Patent: May 27, 2025

(54) DETACHABLE BIRD FEEDER

(71) Applicant: Guannan Chen, Foshan (CN)

(72) Inventor: Guannan Chen, Foshan (CN)

( * ) Notice: Subject to any disclaimer, the term of this patent is extended or adjusted under 35 U.S.C. 154(b) by 0 days.

(21) Appl. No.: 18/799,848

(22) Filed: Aug. 9, 2024

(51) Int. Cl.
A01K 39/00 (2006.01)
A01K 39/012 (2006.01)

(52) U.S. Cl.
CPC .................. A01K 39/012 (2013.01)

(58) Field of Classification Search
CPC .. A01K 39/012; A01K 39/01; A01K 39/0125; A01K 39/014
See application file for complete search history.

(56) References Cited

U.S. PATENT DOCUMENTS

| | | | | |
|---|---|---|---|---|
| 1,217,438 A * | 2/1917 | Gallagher | ............ | A01K 39/012 119/70 |
| 4,977,859 A * | 12/1990 | Kilham | ................ | A01K 39/012 119/52.2 |
| 5,044,319 A * | 9/1991 | Blasbalg | ............... | A01K 39/012 119/57.9 |
| 5,062,388 A * | 11/1991 | Kilham | ................ | A01K 39/012 119/52.2 |
| 5,289,796 A * | 3/1994 | Armstrong | ........... | A01K 39/012 119/59 |
| 5,829,383 A * | 11/1998 | Blanding | ............. | A01K 39/012 119/52.3 |
| 6,253,706 B1 * | 7/2001 | Sloop | ................... | A01K 39/014 119/52.3 |
| 2007/0095295 A1 * | 5/2007 | Hepp | ................... | A01K 39/012 119/57.8 |
| 2010/0300364 A1 * | 12/2010 | Sena | ..................... | A01K 39/012 119/51.01 |
| 2015/0366168 A1 * | 12/2015 | Cote | ..................... | A01K 39/012 29/434 |
| 2019/0313608 A1 * | 10/2019 | Cote | ..................... | A01K 39/012 |

OTHER PUBLICATIONS iBorn Store, iBorn Metal Bird Feeder for Outside Hanging,Wild Bird Feeders for Cardinal, 18cm Large Roof&Tray Green 6 Port (Seed is not Included), Inventor started the first sale of this product Sep. 7, 2023. Date on Aug. 9, 2024. The link of the sale: https://www.amazon.com/dp/B0CHJL9N3X?th=1.

* cited by examiner

Primary Examiner — Trinh T Nguyen

(57) ABSTRACT

The present disclosure proposes a detachable bird feeder, including: a seed tray provided with first connecting section; a seed reservoir, the bottom opening of the seed reservoir resting over the surface of seed tray, the seed reservoir comprises a second connecting section, and the second connecting section being located in a internal cavity; a top cover movably placed over the top opening of the seed reservoir; and a locking component having a first threaded hole, the locking component being located in the internal cavity, and the first threaded hole being threaded with a First threaded section; alternatively, the locking component being located at the bottom of the seed tray, and the first threaded hole being threaded with a Second threaded section. The detachable bird feeder can separate the seed reservoir from the seed tray and facilitates independent cleaning of the seed tray and the seed reservoir.

9 Claims, 15 Drawing Sheets

DETACHABLE BIRD FEEDER

TECHNICAL FIELD

The present disclosure relates to the technical field of feeders, and in particular to a detachable bird feeder that is detachable for thorough cleaning.

BACKGROUND

Bird feeders are often designed to place birdseed and aim to attract birds to feed, so that people can observe and study birds. This device can be placed in public places or in a personal courtyard, helping birds to get food, and also providing a platform for people to observe birds.

At present, in the bird feeder available in the market, a seed tray is fixedly connected to a seed reservoir, and in a long-term use process, it is easy to leave a lot of food residue in the bird feeder, which is inconvenient to clean up.

SUMMARY

An embodiment of the present disclosure provides a bird feeder, in order to solve the problems existing in related art. The technical solution thereof is described as follows.

An embodiment of the present disclosure provides a detachable bird feeder, including:

a seed tray as first connecting section;

a seed reservoir, the bottom opening of the seed reservoir detachably resting over the surface of seed tray, and the seed reservoir has an internal cavity with the bottom opening and the top opening, wherein the bottom opening and the top opening each communicate with the internal cavity and facilitate seed flow and thorough cleaning inside the internal cavity. The bottom opening is situated around the seed tray as first connecting section; the seed reservoir is provided with a second connecting portion, and the second connecting portion is located in the internal cavity.

a top cover, the top cover is movable and placed over at the top opening of the seed reservoir, and the top cover covering the top opening;

a transverse connector, configured to extends transversely through the seed reservoir and, in conjunction with the vertical connector. The first transverse end of the transverse connector is connected to a first side of two opposing sides of the seed reservoir, a second transverse end of the transverse connector is connected to a second side of two opposing sides of the seed reservoir, and the second connecting section is provided on the transverse connector.

a vertical connector, the lower end of the vertical connector is provided with the second threaded section, being connected to the seed tray as first connecting section; the upper end of the vertical connector is provided with the first threaded section; the upper end of the vertical connector penetrates the transverse connector as the second connecting section. Alternatively, the lower end of the vertical connector is provided with the second threaded section penetrates the seed tray as the first connecting section; and the upper end of the vertical connector is provided with the fourth threaded section being connected into the transverse connector as the second connecting section.

a locking component having a first threaded hole, wherein in the case that the lower end of the vertical connector is connected to the first connecting section and that the upper end of the vertical connector penetrates the transverse connector as the second connecting section, the locking component is located in the seed reservoir, the first threaded hole is threaded onto the first threaded section on the upper end of the vertical connector, and the locking component abuts against a side of the second connecting portion away from the first connecting portion and in the case that the lower end of the vertical connector penetrates the first connecting section on the seed tray and that the upper end of the vertical connector is connected to the second connecting section, the locking component is located at the bottom of the seed tray, the first threaded hole is threaded onto the second threaded section on the lower end of the vertical connector, and the locking component abuts against a side of the first connecting portion away from the second connecting portion.

The foregoing description is intended to illustrate the embodiment of the present disclosure and is not intended to limit the scope thereof. In addition to the aspects, implementations and features described above, further aspects, implementations and features of the present disclosure will be evident with reference to the accompanying drawings and the detailed description that follows.

BRIEF DESCRIPTION OF THE DRAWINGS

In figures, the same reference numerals denote the same or similar components or elements throughout multiple figures unless otherwise specified. These figures may not be drawn to scale and are provided for illustrative purpose only. It should be noted that these figures depict only a few embodiment of the present disclosure and should not to be construed as limiting the scope of the present disclosure.

LIST OF REFERENCE NUMERALS

Figure 1:
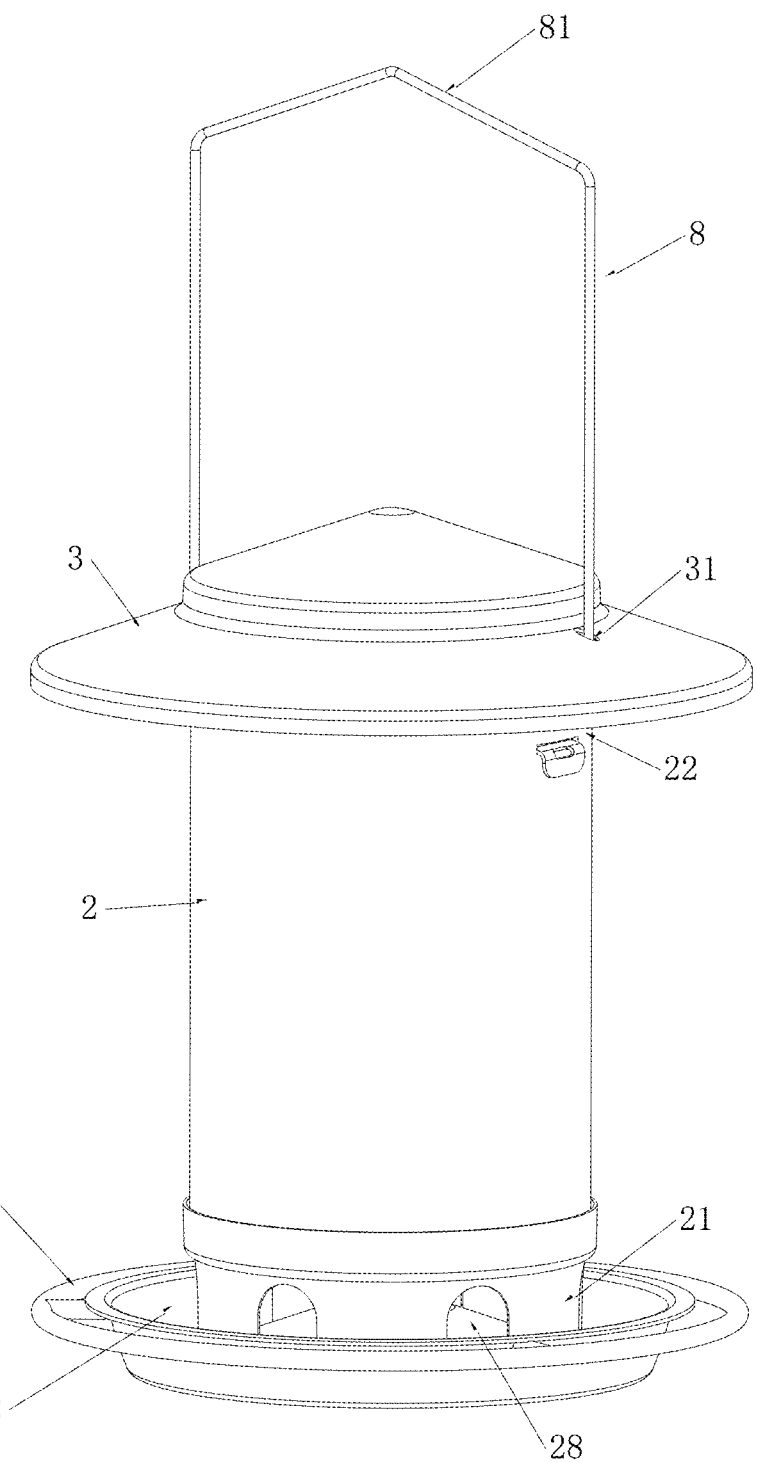
FIG. 1 is a perspective schematic diagram of the structure of a detachable bird feeder according to the first implementation of the present disclosure, wherein the detachable bird feeder represents the first embodiment of this design concept, employing a connecting structure as outlined in the first implementation.

1. Seed tray; 11. First connecting section; 111. Second threaded hole; 12. Feeding trough; 2. Seed reservoir; 21. Lower end of seed reservoir; 22. Upper end of seed reservoir; 23. Internal cavity; 24. Bottom opening; 25. Top opening; 26. First connecting hole; 27. Second connecting hole; 28. Seed Outlet; 29. Feeding port; 210. Perch rod; 3. Top cover; 31. Third connecting hole; 4. Vertical connector; 41. Lower end of vertical connector; 42. Upper end of vertical connector; 43. First threaded section; 44. Second threaded section; 45. Third threaded section; 46. Fourth threaded section; 5. Locking component; 51. First threaded hole; 6. Transverse connector; 61. Second connecting section; 611. Third threaded hole; 62. First transverse end; 63. Second transverse end; 64. First limiting portion; 65. Second limiting portion; 66. Perforation; 7. Joint Connector; 71. Fourth connecting hole; 8. Hanging assemblage; 81. Hanging section; 82. Third connecting section; 83. Third limiting portion.

DETAILED DESCRIPTION OF EMBODIMENTS

Only some exemplary embodiments will be briefly described below. As can be appreciated by those skilled in the art, modifications may be made to the described embodiments in various ways without departing from the spirit or scope of the present disclosure. Therefore, the drawings and the description are considered as exemplary in nature rather than limiting.

FIGS. 1-15 show detachable bird feeders according to preferred implementation of the present disclosure. The detachable bird feeder includes:

a seed tray 1, the seed tray 1 being as first connecting section 11;

a seed reservoir 2, a lower end 21 of the seed reservoir resting over the surface of seed tray 1, and the seed reservoir 2 having a internal cavity 23, the bottom opening 24 and the top opening 25, wherein the seed reservoir has a internal cavity 23, a passage-like interior open from top to bottom. The bottom opening 24 is covered by the seed tray 1, the bottom opening 24 is designed to connect with the first connecting section 11 inset on the seed tray 1, the seed reservoir 2 is inserted with a second connecting portion 61, and the second connecting section 61 is located in the internal cavity 23;

a top cover 3, the top cover 3 is movable and placed over at an upper end 22 of the seed reservoir, and the top cover 3 covering the top opening 25;

a vertical connector 4, a lower end 41 of the vertical connector being connected to the first connecting section 11, an upper end 42 of the vertical connector penetrates the second connecting section 61, and the upper end 42 of the vertical connector is provided with a First threaded section 43; alternatively, the lower end 41 of the vertical connector is provided with the Second threaded section 44 penetrates the seed tray 1; and the upper end 42 of the vertical connector is provided with the fourth threaded section 46 being connected to the transverse connector as the second connecting section 61.

a locking component 5, the locking component 5 having a first threaded hole 51, wherein in the case that the lower end 41 of the vertical connector is connected to the first connecting section 11 and that the upper end 42 of the vertical connector penetrates the second connecting section 61, the locking component 5 is located in the internal cavity 23, the first threaded hole 51 is threaded onto the first threaded section 43, and the locking component 5 abuts against a side of the second connecting portion 61 away from the first connecting portion 11; and in the case that the lower end 41 of the vertical connector penetrates first connecting section 11 and that the upper end 42 of the vertical connector is connected to the second connecting section 61 on one side of the transverse connector 6, the locking component 5 is located at the bottom of the seed tray 1, the first threaded hole 51 is threaded onto the Second threaded section 44, and the locking component 5 abuts against a side of the first connecting section 11 away from the second connecting section 61.

The detachable bird feeder according to an embodiment of the present disclosure includes the seed tray 1, the seed reservoir 2, the top cover 3, the vertical connector 4 and the locking component 5, wherein in the case that the lower end 41 of the vertical connector is connected to the first connecting section 11 and that the upper end 42 of the vertical connector penetrates the second connecting section 61, the lower end 41 of the vertical connector can be fixedly connected to the seed tray 1 by connecting the lower end 41 of the vertical connector with the first connecting section 11, and the upper end 42 of the vertical connector is detachably connected to the seed reservoir 2 by enabling the upper end 42 of the vertical connector to penetrates the second connecting section 61 and also enabling the first threaded hole 51 in the locking component 5 to be threaded onto the First threaded section 43 and enabling the locking component 5 to abut against a side of the second connecting section 61 away from first connecting section 11, so that the seed tray 1 and the seed reservoir 2 are detachably connected together, thereby ensuring that the seed tray 1 and the seed reservoir 2 can be disassembled and assembled while the seed tray 1 and the seed reservoir 2 are reliably fixed together, wherein the unlocking of the seed reservoir 2 is achieved by unscrewing the locking component 5 out of the interior of the seed reservoir 2, then the seed reservoir 2 is pulled from the seed tray 1 so that the seed reservoir 2 is disengaged from the upper end 42 of the vertical connector, thereby separating the seed reservoir 2 from the seed tray 1, facilitating thorough cleaning of the seed tray 1 and the seed reservoir 2 independently, thereby reducing susceptibility of inaccessible areas during cleaning, and enhancing overall cleanliness and hygiene for bird feeding; and in the case that the lower end 41 of the vertical connector penetrates the first connecting section 11 and that the upper end 42 of the vertical connector is connected to the second connecting section 61, the upper end 42 of the vertical connector can be fixedly connected to the seed reservoir 2 by connecting the upper end 42 of the vertical connector with the second connecting section 61, and the lower end 41 of the vertical connector is detachably connected to the seed tray 1 by enabling the lower end 41 of the vertical connector to penetrates the first connecting section 11 and also enabling the first threaded hole 51 of the locking component 5 to be threaded onto the Second threaded section 44 and enabling the locking component 5 to abut against the first connecting section 11 away from the second connecting section 61, so that the seed tray 1 and the seed reservoir 2 are detachably connected together, thereby ensuring that the seed tray 1 and the seed reservoir 2 can be disassembled and assembled while the seed tray 1 and the seed reservoir 2 are reliably fixed together, wherein the unlocking of the seed tray 1 is achieved by unscrewing the locking component 5 from the bottom of the seed tray 1, then the seed tray 1 is pulled downwards to disengage the seed tray 1 from the lower end 41 of the vertical connector, thereby separating the seed tray 1 from the seed reservoir 2, facilitating thorough cleaning of the seed tray 1 and the seed reservoir 2 independently, thereby reducing susceptibility of inaccessible areas during cleaning, and enhancing overall cleanliness and hygiene for bird feeding.

In addition, the locking component 5, as the only unlocking component, is based on the fact that the locking component 5 is located in the seed reservoir 2 or at the bottom of the seed tray 1, in actual use, the locking component 5 located in the seed reservoir 2 or at the bottom of the seed tray 1 is not or is not easily accessible to birds, squirrels, raccoons or other animals, so that the locking component 5 is not freely loosened when the birds, the squirrels, the raccoons or other animals attempt to feed on or destroy, which can improve the stability and reliability of the connection between the seed tray 1 and the seed reservoir 2, and can effectively limit the detachment of the seed tray 1.

In addition, since the top cover 3 is movable and placed over the upper end 22 of the seed reservoir, the top cover 3 can be separated from the seed reservoir 2, and the top cover 3 can be opened to add birdseed to the internal cavity 23. At the same time, it is possible to detach the top cover 3 from the seed reservoir 2, thereby facilitating thorough cleaning of the top cover 3 and the seed reservoir 2 independently, thereby reducing susceptibility of inaccessible areas during cleaning, and enhancing overall cleanliness and hygiene for bird feeding.

In an implementation, the locking component 5 may be a thumb nut for ease of screwing and unscrewing operation, or may be a standard common nut having a circular or square cross-section.

With reference to FIGS. 1-8, in an implementation, in the case that the lower end 41 of the vertical connector is connected to the first connecting section 11 and that the upper end 42 of the vertical connector penetrates the second connecting section 61, the first connecting section 11 has a second threaded hole 111, the lower end 41 of the vertical connector is provided with a Third threaded section 45, and the Third threaded section 45 is threaded onto the second threaded hole 111, so that the lower end 41 of the vertical connector is reliably fixed to the seed tray 1, the seed tray 1 and the seed reservoir 2 are reliably fixed together, and at the same time, the lower end 41 of the vertical connector can be detached from the seed tray 1, facilitating thorough cleaning of the vertical connector 4 and the seed tray 1 independently, thereby reducing susceptibility of inaccessible areas during cleaning, and enhancing overall cleanliness and hygiene for bird feeding.

Figure 6:
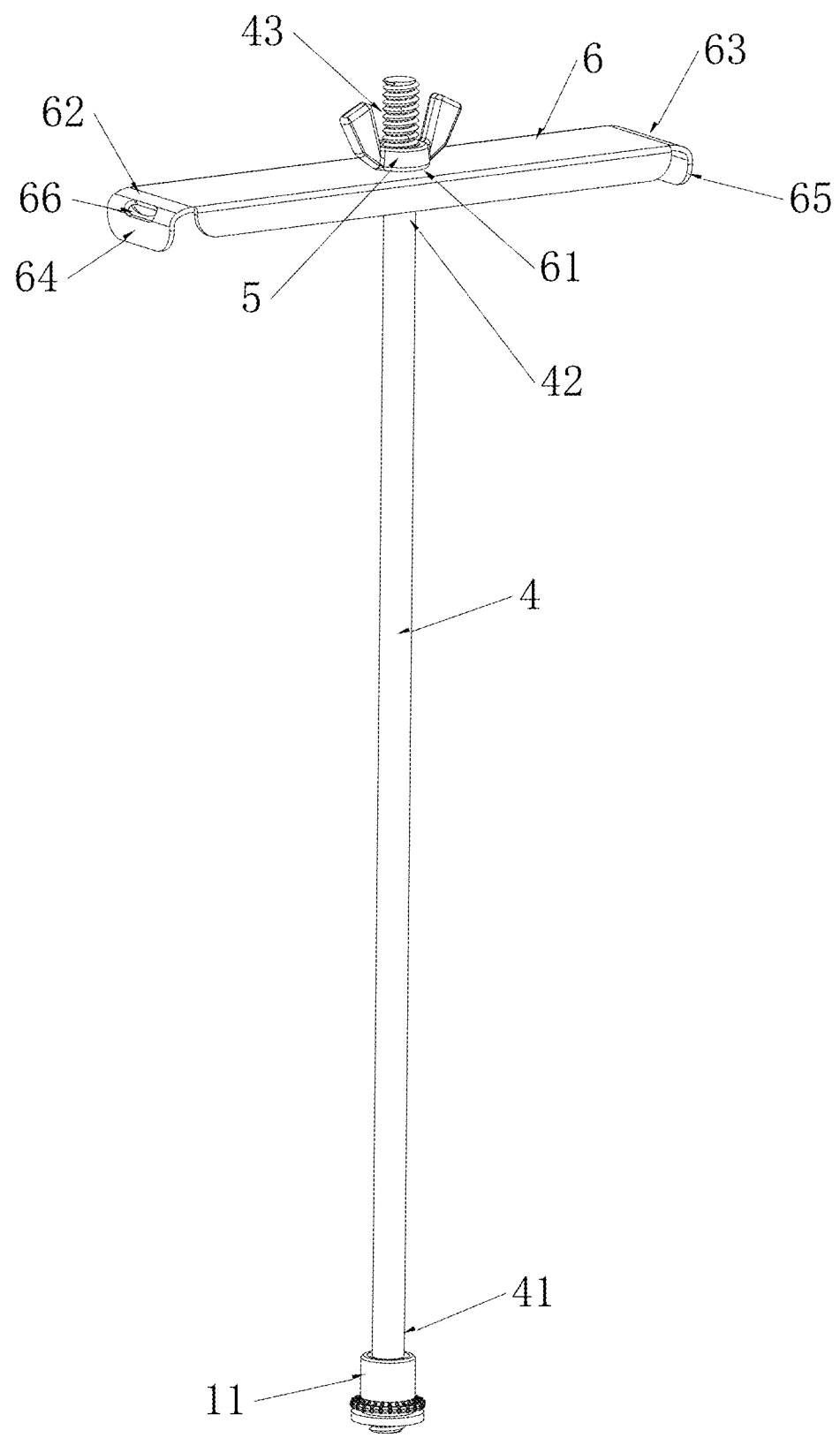
FIG. 6 is a perspective schematic structural diagram of a connecting structure in the first implementation of the present disclosure.
Figure 7:
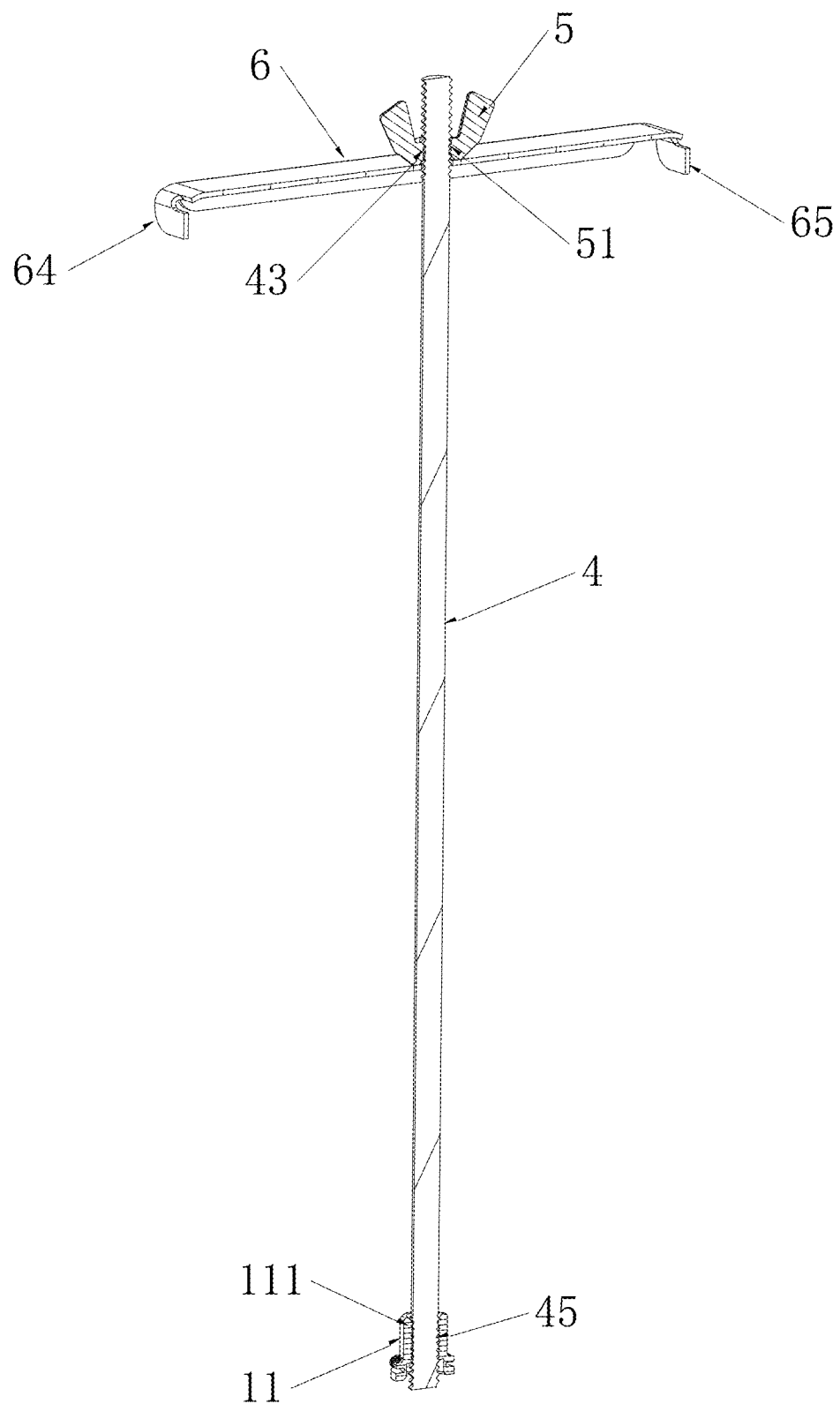
FIG. 7 is a cross-sectional view of the connecting structure in the first implementation of the present disclosure.
Figure 8:
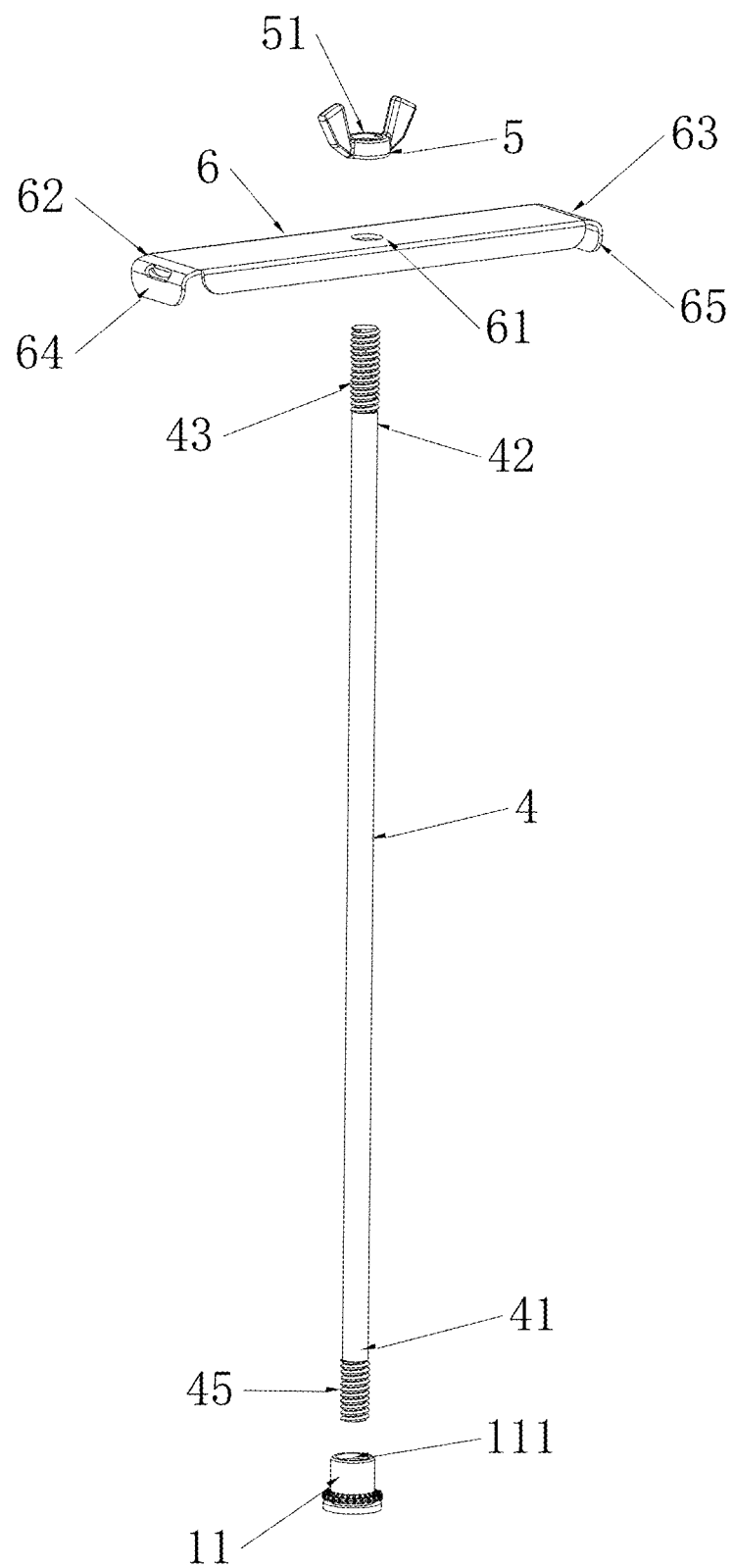
FIG. 8 is an exploded view of the connecting structure in the first implementation of the present disclosure.
Figure 9:
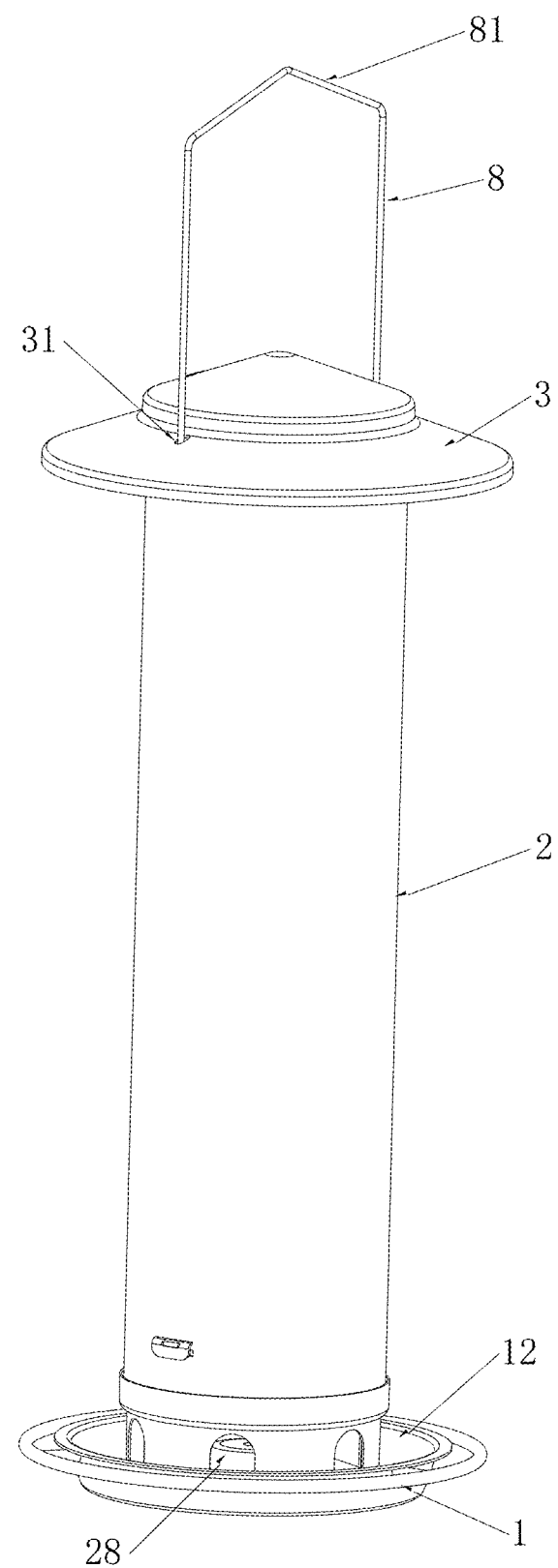
FIG. 9 is a perspective schematic diagram of the structure of a detachable bird feeder according to the second implementation of the present disclosure, wherein the detachable bird feeder represents the fourth embodiment of this design concept, employing a connecting structure as outlined in the second implementation.

In order to facilitate the machining of the seed tray 1, with reference to FIGS. 6-8, in the case that the lower end 41 of the vertical connector penetrates the first connecting section 11 and that the upper end 42 of the vertical connector penetrates the second connecting section 61, the first connecting section 11 (for example, the first connecting section 11 may be a nut) and the seed tray 1 may be separately provided, that is, the first connecting section 11 and the seed tray 1 each are of separate structures, and the first connecting section 11 is inserted into a mounting hole of the seed tray 1 by riveting, so that the first connecting section 11 is integrated with the seed tray 1.

In other implementations, the first connecting section 11 may also be prepared as an integral part with the seed tray 1 by integrally forming.

Referring to FIGS. 9-15, in an implementation, in the case that the lower end 41 of the vertical connector penetrates the first connecting section 11 and that the upper end 42 of the vertical connector is connected to the second connecting section 61, the second connecting section 61 has a third threaded hole 611, the upper end 42 of the vertical connector is provided with a Fourth threaded section 46, and the Fourth threaded section 46 is threaded onto the third threaded hole 611, so that the upper end 42 of the vertical connector is reliably fixed to the seed reservoir 2, the seed tray 1 and the seed reservoir 2 are reliably fixed together, and at the same time, the upper end 42 of the vertical connector can be detached from the seed reservoir 2, facilitating thorough cleaning of the vertical connector 4 and the seed reservoir 2 independently, thereby reducing susceptibility of inaccessible areas during cleaning, and enhancing overall cleanliness and hygiene for bird feeding.

To facilitate assembling and disassembly of the seed reservoir 2, refer to FIGS. 2, 6-8, 10 and 13-15. In an implementation, the detachable bird feeder further includes:

a transverse connector 6, wherein a first transverse end 62 of the transverse connector 6 is connected to a first side of two opposing sides of the seed reservoir 2, a second transverse end 63 of the transverse connector 6 is connected to a second side of the two opposing sides of the seed reservoir 2, and the second connecting section 61 is disposed on the transverse connector 6.

Figure 13:
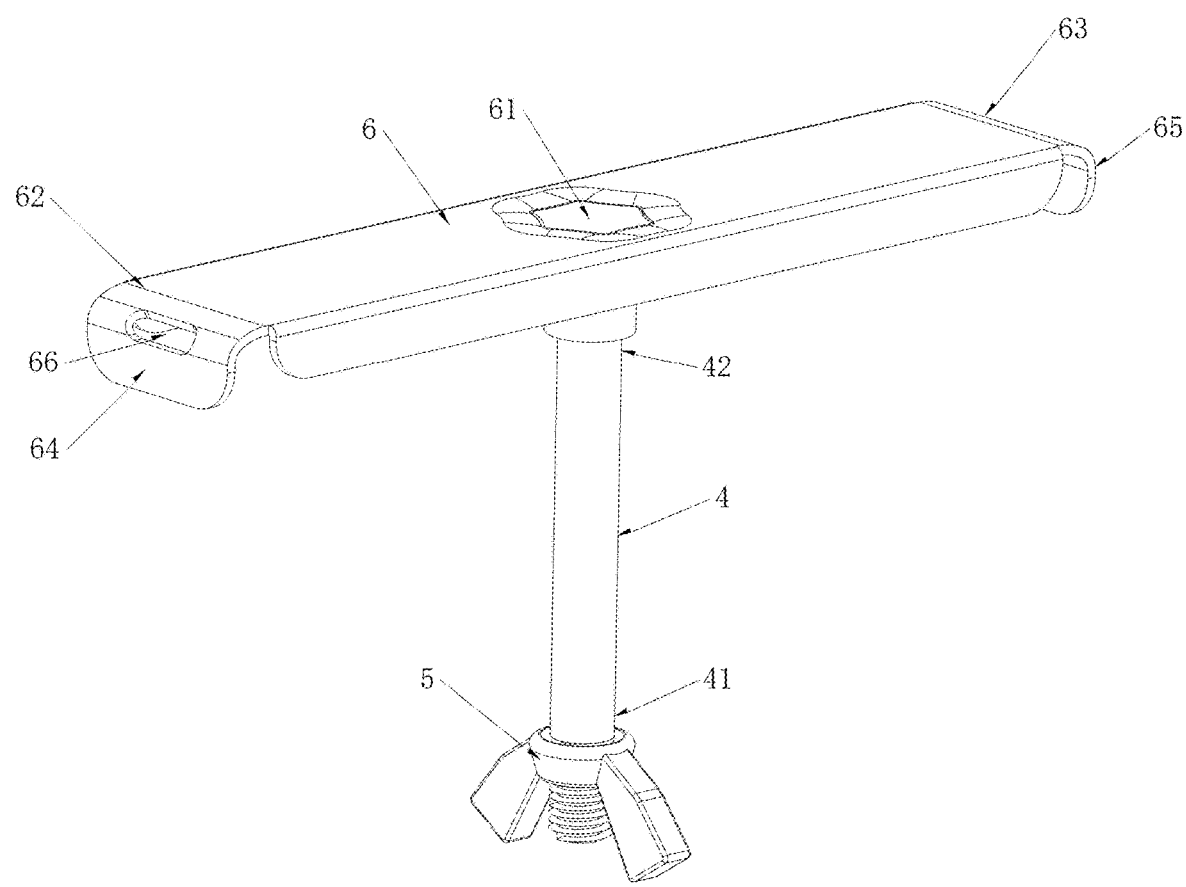
FIG. 13 is a perspective schematic structural diagram of a connecting structure in the second implementation of the present disclosure.
Figure 14:
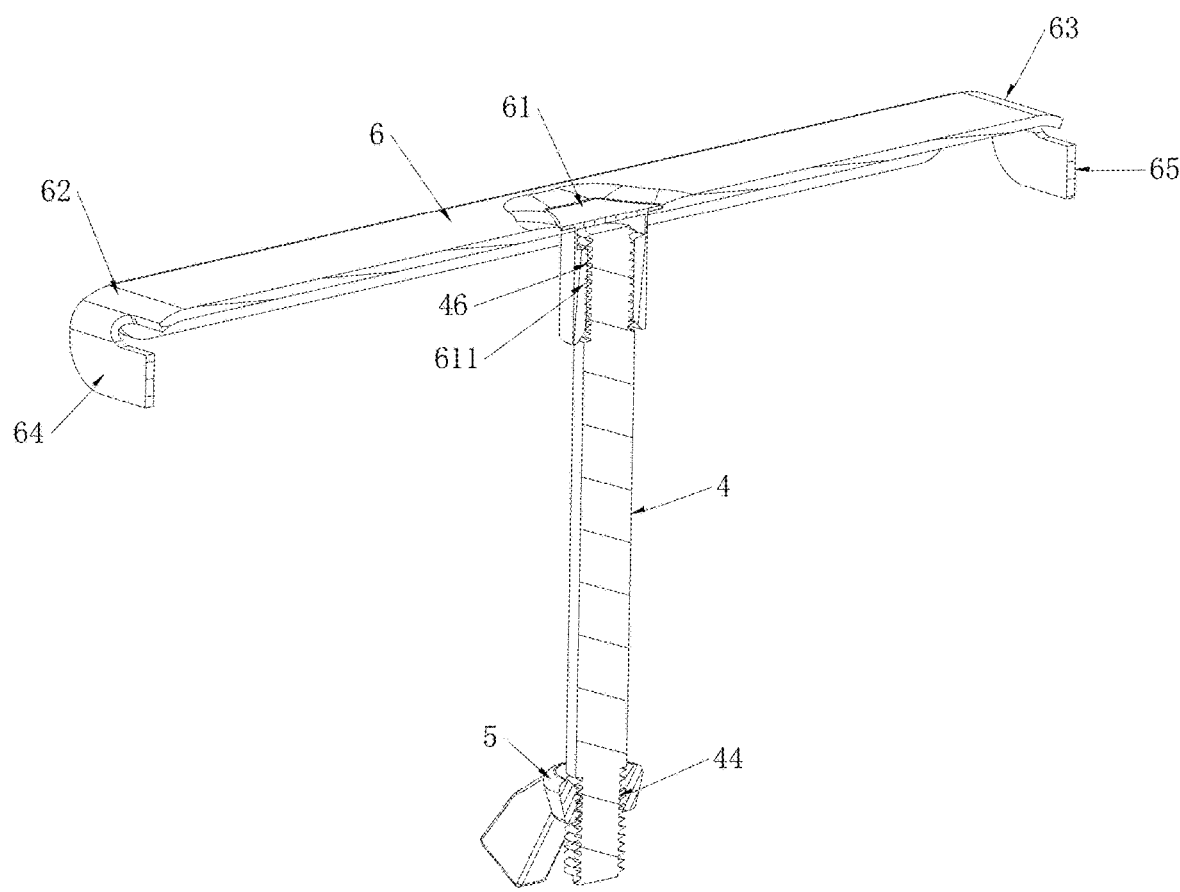
FIG. 14 is a cross-sectional view of the connecting structure in the second implementation of the present disclosure.
Figure 15:
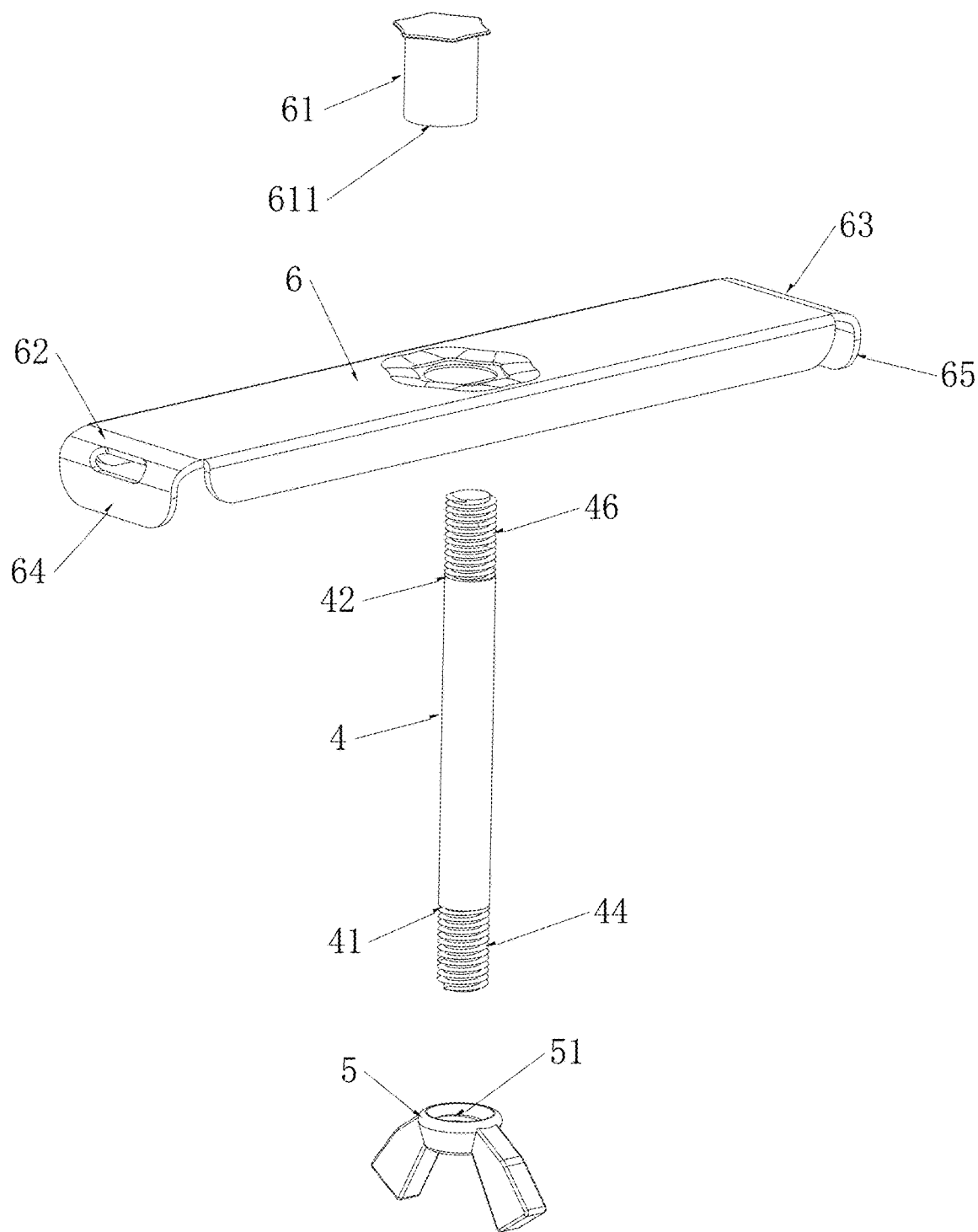
FIG. 15 is an exploded view of the connecting structure in the second implementation of the present disclosure.

In order to facilitate the manufacturing of the transverse connector 6, refer to FIGS. 13-15, in the case that the lower end 41 of the vertical connector penetrates the first connecting section 11 and that the upper end 42 of the vertical connector is connected to the second connecting section 61, the second connecting section 61 and the transverse connector 6 may be separately provided, that is, the second connecting section 61 and the transverse connector 6 each are of separate structures, and the second connecting section 61 is inserted into a mounting hole of the transverse connector 6 by riveting, so that the second connecting section 61 is integrated with the transverse connector 6.

In other implementations, the second connecting section 61 may also be prepared as an integral part with the transverse connector 6 by integrally forming.

Figure 2:
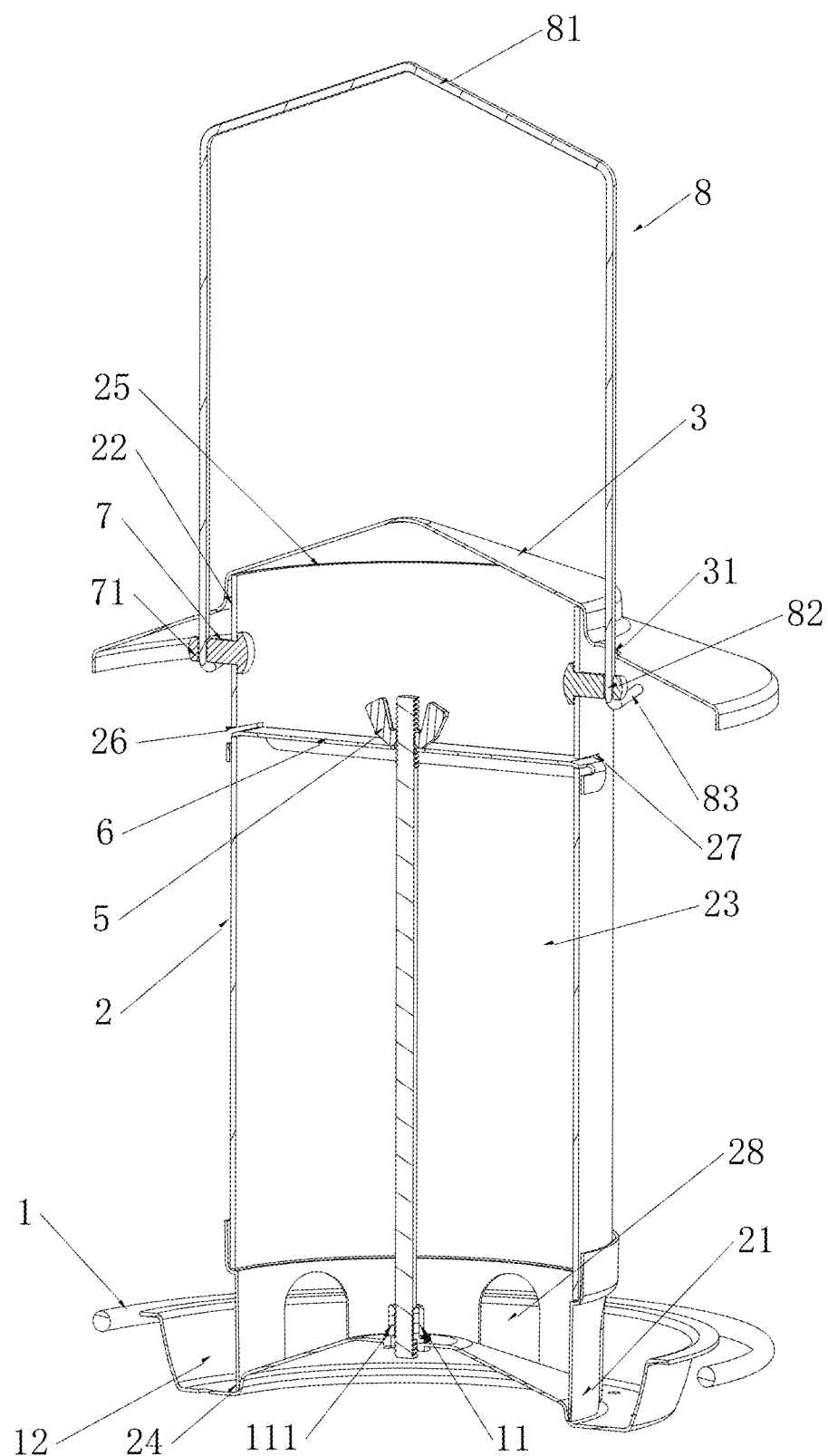
FIG. 2 is a cross-sectional view of a detachable bird feeder, illustrating the first embodiment according to the first implementation of the present disclosure.
Figure 3:
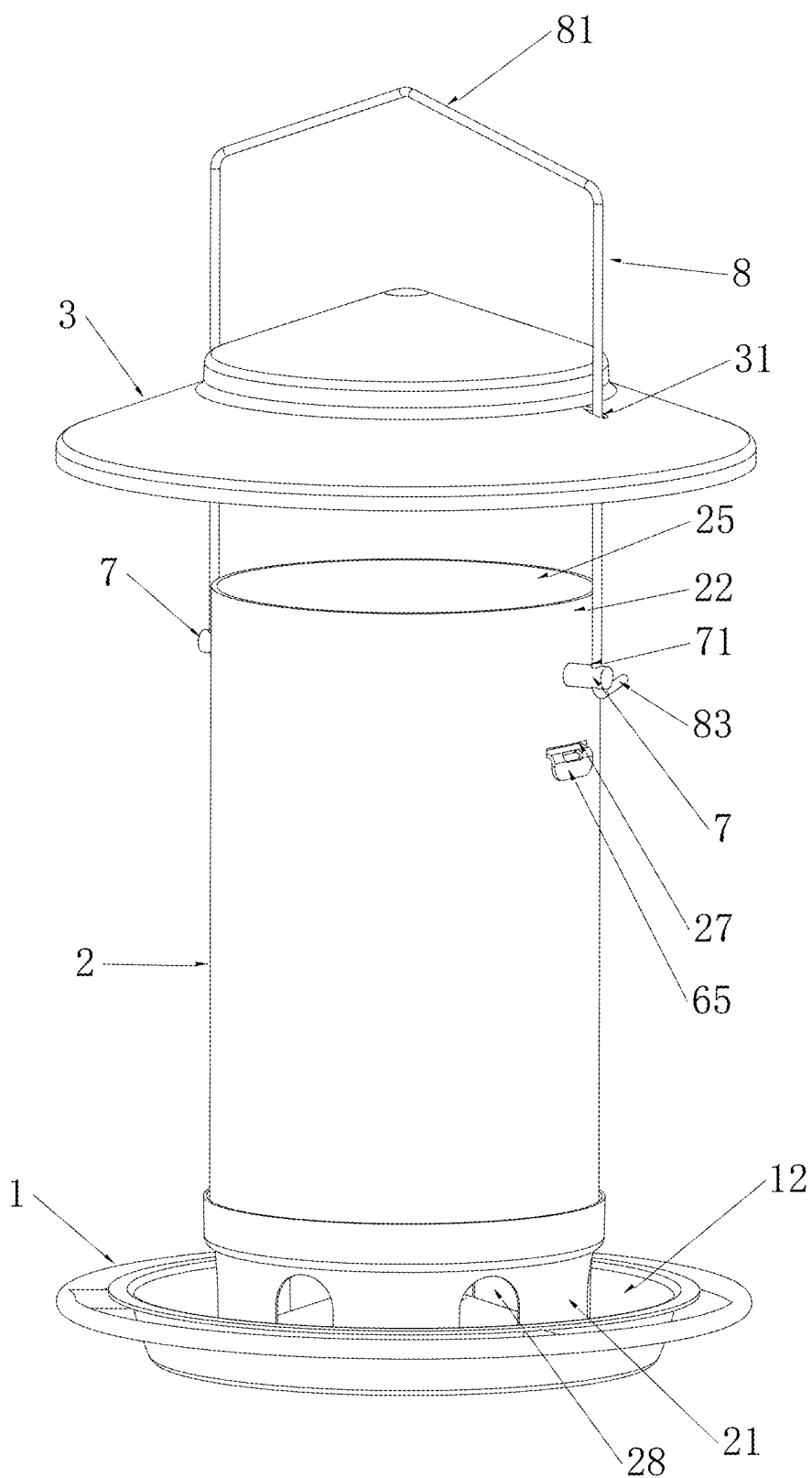
FIG. 3 is a perspective schematic diagram of the structure of a detachable bird feeder according to the first implementation of the present disclosure, the first embodiment of this design concept in which the top cover is in an open state.
Figure 10:
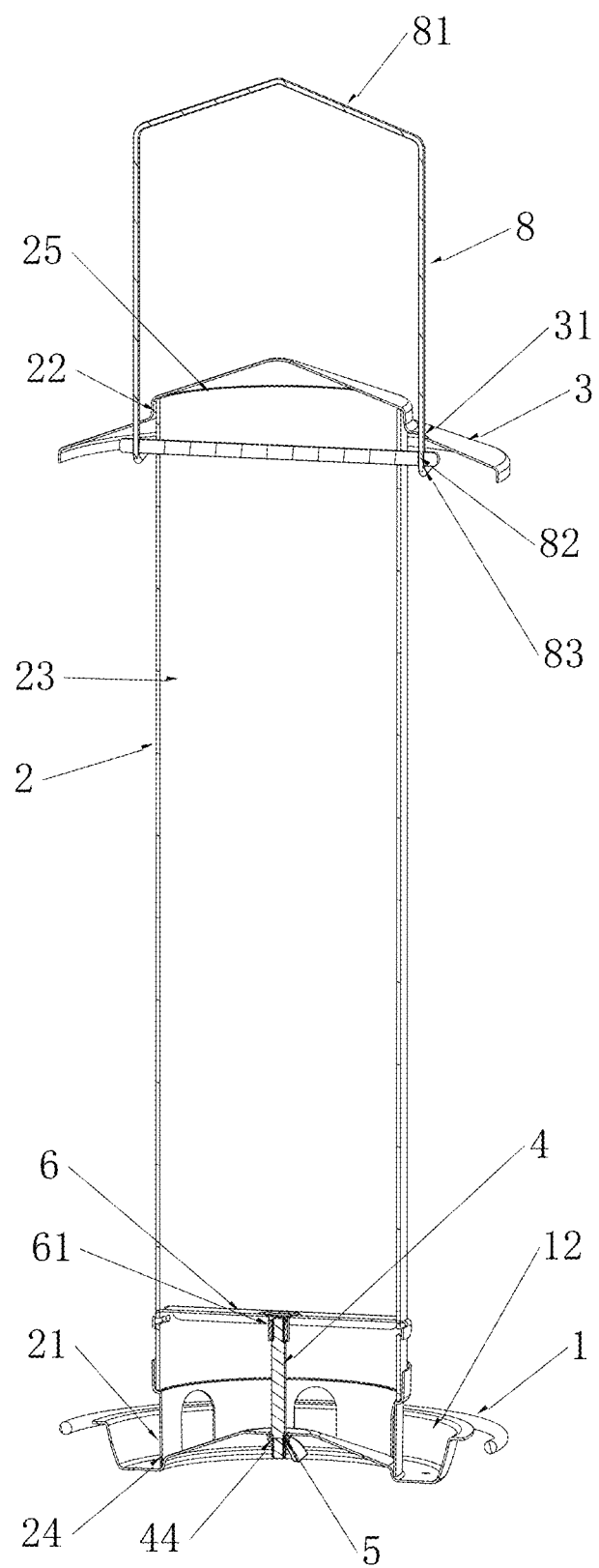
FIG. 10 is a cross-sectional view of a detachable bird feeder, illustrating the fourth embodiment according to the second implementation of the present disclosure.

Referring to FIGS. 2 and 10, in an implementation, a first side of the two opposing sides of the seed reservoir 2 has a first connecting hole 26, the first connecting hole 26 communicates with the internal cavity 23, a second side of the two opposing sides of the seed reservoir 2 has a second connecting hole 27, and the second connecting hole 27 communicates with the internal cavity 23;

the first transverse end 62 of the transverse connector 6 extends through the first connecting hole 26, the first transverse end 62 of the transverse connector 6 is provided with a first limiting portion 64, the first limiting portion 64 is exposed outside the seed reservoir 2, and the first limiting portion 64 can abut against an outer sidewall of the seed reservoir 2, so as to limit the first transverse end 62 of the transverse connector 6 from disengaging from the first connecting hole 26; and the second transverse end 63 of the transverse connector 6 extends through the second connecting hole 27, the second transverse end 63 of the transverse connector 6 is provided with a second limiting portion 65, the second limiting portion 65 is exposed outside the seed reservoir 2, and the second limiting portion 65 can abut against the outer sidewall of the seed reservoir 2, so as to limit the second transverse end 63 of the transverse connector 6 from disengaging from the second connecting hole 27. In this way, during mounting, the first limiting portion 64 is exposed outside the seed reservoir 2 by enabling the first limiting portion 64 and the first transverse end 62 of the transverse connector 6 to successively penetrate the first connecting hole 26, the second limiting portion 65 is exposed outside the seed reservoir 2 by enabling the first limiting portion 64 to abut against a outer sidewall of the seed reservoir 2 and then enabling the second limiting portion 65 and the second transverse end 63 of the transverse connector 6 to successively penetrate the second connecting hole 27, and the transverse connector 6 can be mounted on the seed reservoir 2 by enabling the second limiting portion 65 to abut against the outer sidewall of the seed reservoir 2, thus the mounting of the transverse connector 6 can be screw-free. Tool-free installation makes mounting the transverse connector 6 more convenient and improves efficiency.

Referring to FIGS. 2, 6, 10 and 13, in an implementation, the first limiting portion 64 and the second limiting portion 65 both are bent downwards with respect to the transverse connector 6 such that the first limiting portion 64 and the second limiting portion 65 both can abut against the outer sidewall of the seed reservoir 2, so that the transverse connector 6 is reliably fixed to the seed reservoir 2, and the first limiting portion 64 and the second limiting portion 65 each have a Perforation 66. On the basis of the first limiting portion 64 having the Perforation 66, the first limiting portion 64 can be easily bent, reducing the bending difficulty of the first limiting portion 64, and on the basis of the second limiting portion 65 having the Perforation 66, the second limiting portion 65 can be easily bent, reducing the bending difficulty of the second limiting portion 65, thus further improving the mounting efficiency of the transverse connector 6.

Referring to FIG. 2, in an implementation, Joint Connector 7 are provided on two opposing outer sidewalls at the upper end 22 of the seed reservoir; and the top cover 3 rests over the upper end 22 of the seed reservoir, the top cover 3 has a third connecting hole 31 on each of both transverse sides thereof, and the third connecting hole 31 extends through the top cover 3 vertically.

The detachable bird feeder also includes:

a hanging assemblage 8, wherein the hanging assemblage 8 is provided with a Hanging section 81 and two Third connecting sections 82, and each of two lower ends of the Hanging section 81 movably penetrates a corresponding third connecting hole 31, allowing the top cover 3 to move vertically along the Hanging section 81, the upper part of the Hanging section 81 is located above the top cover 3, the upper part of the Hanging section 81 is configured to hang on external support objects that can bear weight, the two third connecting sections 82 are respectively disposed at two lower ends of the Hanging section 81, the third connecting sections 82 are located below the top cover 3, and each third connecting sections 82 is connected to a corresponding Joint Connector 7, securing the top cover 3 and the seed reservoir 2 together. The connection of each third connecting portion 82 of the hanging assemblage 8 to a Joint Connector 7 restricts lateral movement of the top cover 3 from disengaging from the seed reservoir 2, ensuring it remains securely on the upper end 22 of the seed reservoir 2. The hanging section 81 can also connect with an external support, allowing the detachable bird feeder to be suspended. In addition, the ability for the lower ends of the hanging section 81 to move within the third connecting holes 31 allows the top cover 3 to move up and down so that the top cover 3 can be movable from the seed reservoir 2, facilitating adding birdseed to the internal cavity 23; the opening and closing operation of the top cover 3 is simple and convenient for refills, so the detachable bird feeder is easy to use; and the hanging assemblage 8 is implemented for three purposes itself, which not only increases the usage of the hanging assemblage 8, but can also simplify the structure, thus helping to reduce the cost of the detachable bird feeder.

Referring to FIG. 2, in an implementation, third connecting holes 31 are provided on two transverse sides of the top cover 3 around the top opening 25, and the third connecting hole 31 are disposed to be spaced from the top opening 25, preventing external rain or water seeping into the internal cavity 23 through the third connecting holes 31. This design help keeps the bird feed in the internal cavity 23 from becoming getting wet, thereby keeping it dry and suitable for birds to feed on.

Referring to FIG. 2, in an implementation, the Joint Connector 7 is provided with a fourth connecting hole 71, and the fourth connecting hole 71 extends completely through the Joint Connector 7 vertically from top to bottom; and the third connecting section 82 is inserted through the fourth connecting hole 71, the third connecting section 82 is provided with a third limiting portion 83, the third limiting portion 83 is disposed obliquely or perpendicularly with the third connecting section 82, and the third limiting portion 83 is configured to abut against a under side of the Joint Connector 7, thereby preventing the third connecting section 82 from disengaging from the fourth connecting hole 71. In this way, during installation, by enabling the third connecting section 82 and the third limiting portion 83 to successively extend through the fourth connecting hole 71; Subsequently, the third limiting portion 83 is oriented either inclined or perpendicular in relative to the third connecting portion 82 to ensure that the third limiting portion 83 can abut against the under side of the Joint Connector 7. The configuration facilitates a secure connection between the hanging assemblage 8 and the Joint Connector 7, enabling a screw-free connection that simplifies the installation process, making a detachable bird feeder simple, straightforward and efficient.

In an implementation, the vertical connector 4, the transverse connector 6 and the hanging assemblage 8 are all of a structure made of a metal material, so that the vertical connector 4, the transverse connector 6 and the hanging assemblage 8 all have better structural strength.

In other implementations, the vertical connector 4, the transverse connector 6 and the hanging assemblage 8 are all of a structure made of a rigid plastic material, and it is also possible to provide the vertical connector 4, the transverse connector 6 and the hanging assemblage 8 with enough structural strength.

Referring to FIGS. 1-5 and 9-12, in an implementation, the upper part of the seed tray 1 has a Feeding trough 12, the Feeding trough 12 is disposed around the bottom opening 24, the lower end 21 of the seed reservoir has a side wall with a Seed Outlet 28, and the Seed Outlet 28 communicates with the Feeding trough 12. In this way, in the case that the internal cavity 23 is loaded with birdseed, the birdseed at the lower part of the internal cavity 23 can be automatically overflown through the Seed Outlet 28 into the Feeding trough 12 under the influence of gravity, and the birdseed in the Feeding trough 12 will invite birds to feed from it.

In an implementation, the top cover 3 has a top-down projection area that fully covers the bottom-up projection area of the receiving groove 12, allowing the top cover 3 to protect the receiving groove 12 from rain, water and snow, and prevent the bird feed in the receiving groove 12 from becoming wet.

Figure 4:
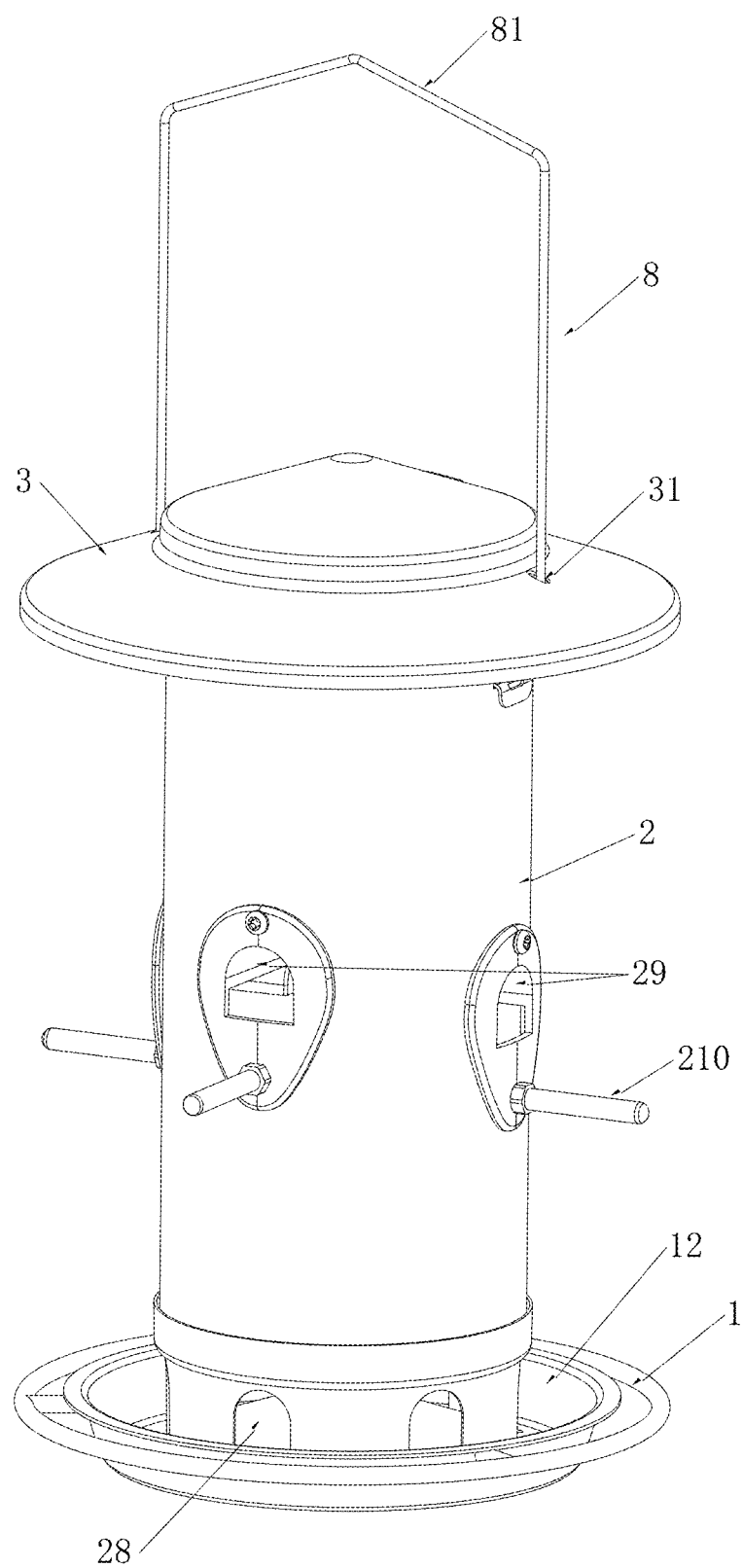
FIG. 4 is a perspective schematic diagram of the structure of a detachable bird feeder according to the first implementation of the present disclosure, wherein the detachable bird feeder represents the second embodiment of this design concept, employing a connecting structure according to the first implementation.
Figure 11:
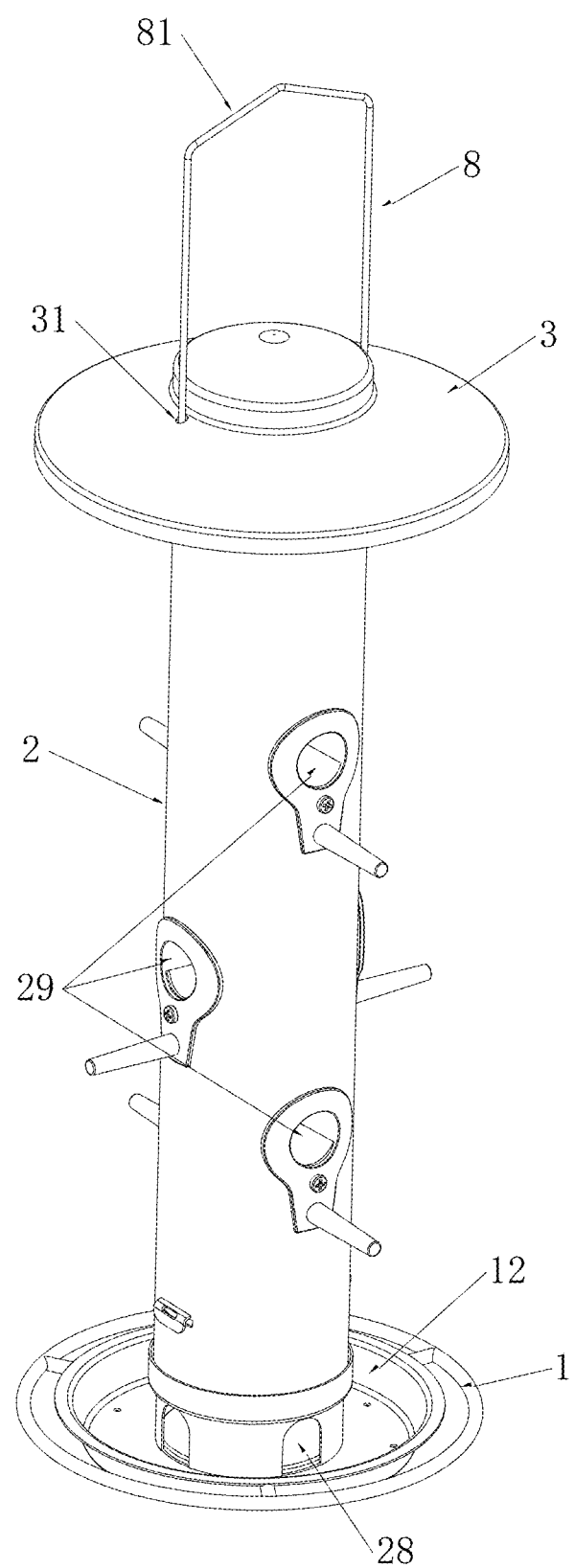
FIG. 11 is a perspective schematic diagram of the structure of the fifth embodiment of the present disclosure, wherein the detachable bird feeder employs a connecting structure according to the second implementation.
Figure 12:
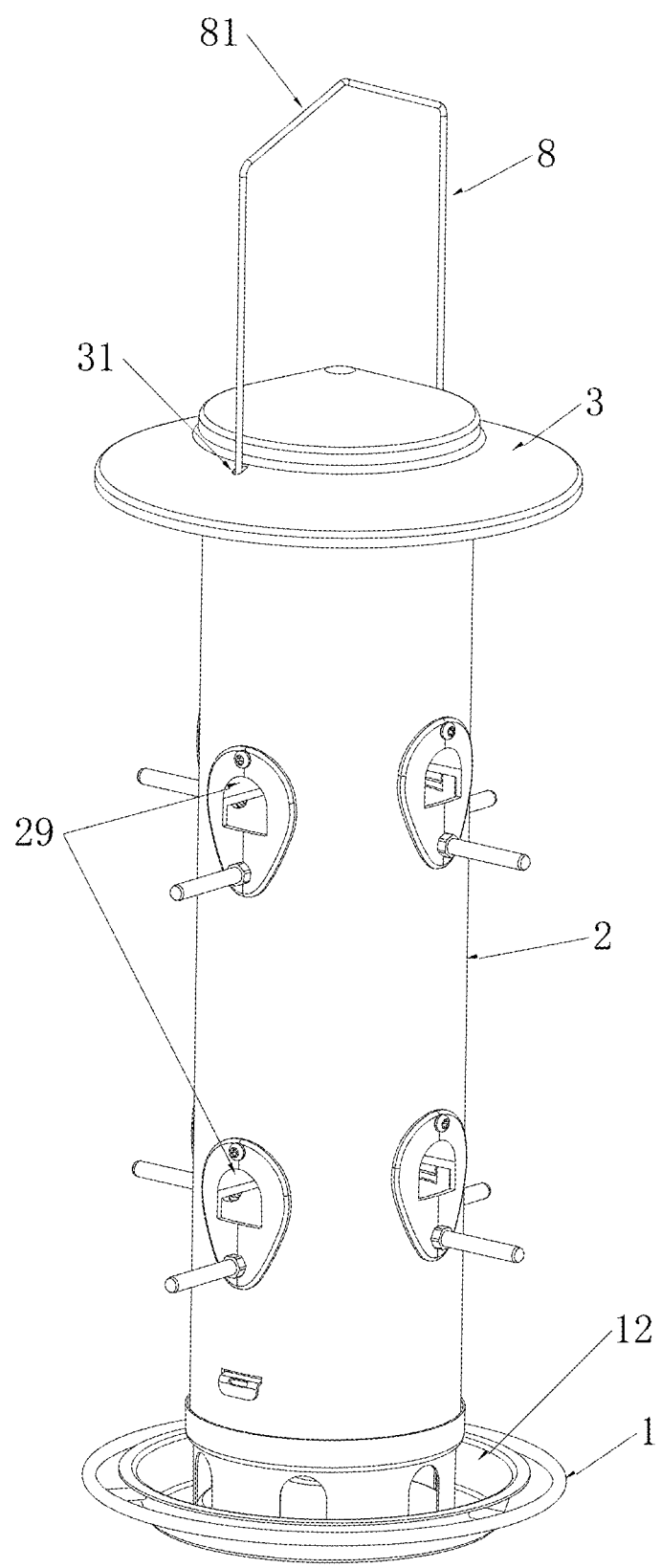
FIG. 12 is a perspective schematic structural diagram of the sixth embodiment of the present disclosure, wherein the detachable bird feeder employs a connecting structure according to the second implementation.

Referring to FIGS. 4, 11 and 12, the peripheral wall of the seed reservoir 2 has a feeding port 29, the feeding port 29 extends through the peripheral wall of the seed reservoir 2, and the feeding port 29 communicates with the internal cavity 23. The feeding port 29 allows the head of the bird to extend into the internal cavity 23 for eating the birdseed.

Referring to FIGS. 4, 11 and 12, the peripheral wall of the seed reservoir 2 is provided with a perch rod 210, the perch rod 210 is located below the feeding port 29, and the perch rod 210 provides a resting place for birds to stand, allowing them to comfortably feed through the feeding port 29.

Referring to FIG. 4, in an implementation, the number of the feeding ports 29 and the number of the perch rods 210 are each four, the four feeding ports 29 are spaced around a vertical centerline of the seed reservoir 2 at intervals, and the perch rod 210 is disposed below the corresponding feeding ports 29.

Referring to FIG. 11, there are six feeding holes 29 and six perch rods 210. The feeding ports 29 are arranged in three pairs, with each pair forming a feeding ports group. These groups are spaced vertically along the height of the seed reservoir 2. Within each group, the two feeding ports 29 are disposed at intervals around the vertical centerline of the seed reservoir 2. Each perch rod 210 is located below its corresponding feeding port 29.

Referring to FIG. 12, there are eight feeding holes 29 and eight perch rods 210. The feeding ports 29 are arranged in four pairs, with each pair forming a feeding ports group. These groups are spaced vertically along the height of the seed reservoir 2. Within each group, the two feeding ports 29 are disposed at intervals around the vertical centerline of the seed reservoir 2. Each perch rod 210 is located below its corresponding feeding port 29.

In other implementations, the number of the feeding ports 29 and the number of the perch rods 210 can be adjusted according to practical requirements.

In an implementation, the cross-section of the seed reservoir 2 can be circular, rectangular, hopper, polygonal, or any other irregular shape.

In an implementation, the outer contours of the seed tray 1 and the top cover 3 can be circular, rectangular, hopper, polygonal or irregular shape.

In an implementation, the outer contour of the transverse connector can be configured according to actual requirements and may be circular, rectangular, polygonal, or any other regular or irregular shape.

In an implementation, the transverse connector may be provided with or without perforations according to specific requirements.

Figure 5:
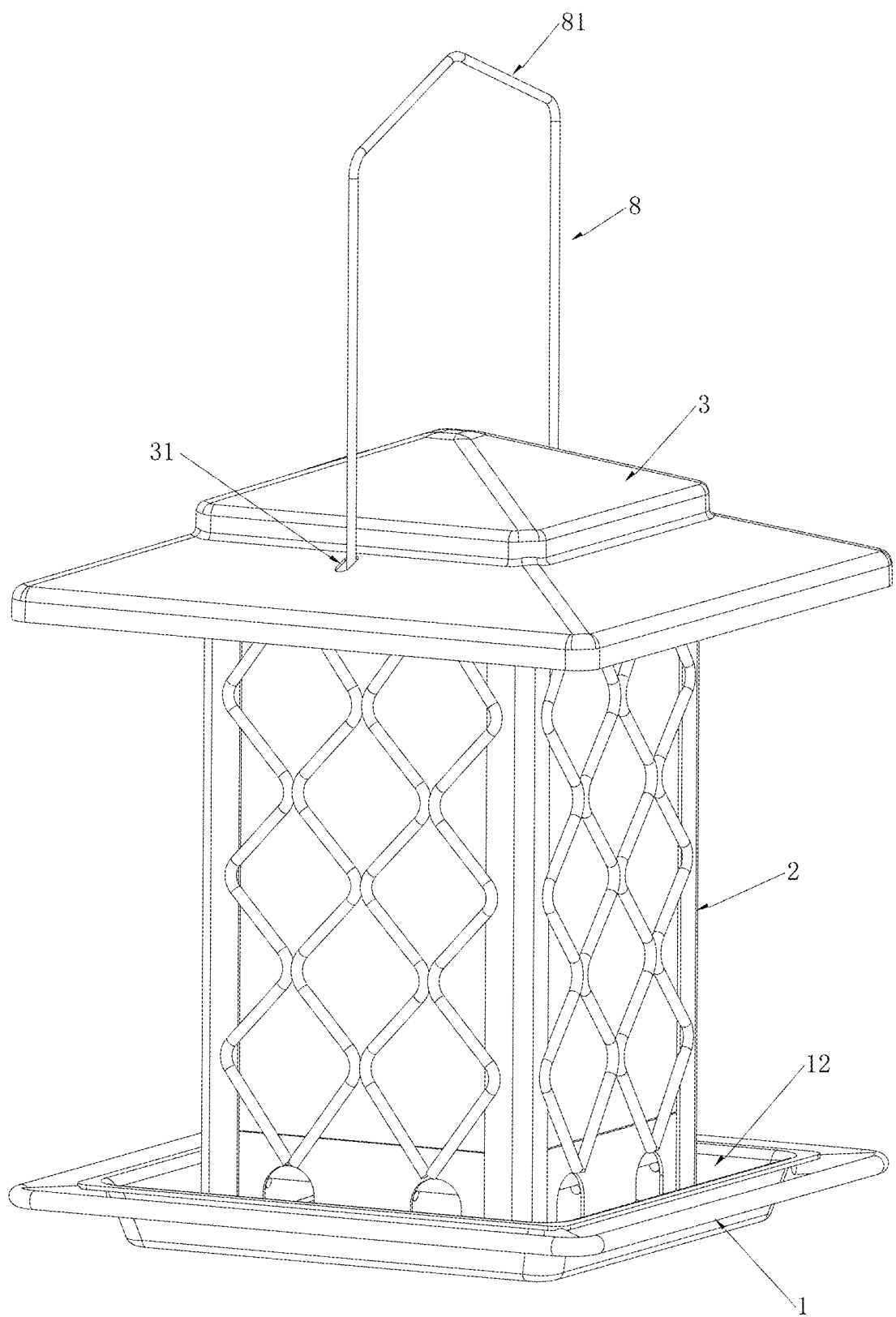
FIG. 5 is a perspective schematic diagram of the structure of a detachable bird feeder according to the first implementation of the present disclosure, wherein the detachable bird feeder represents the third embodiment of this design concept, employing a connecting structure according to the first implementation.

The connecting structure of the detachable bird feeder illustrated in FIGS. 4-5 may be implemented with the connection structure shown in FIGS. 6-8 or with that shown in FIGS. 13-15.

The connecting structure of the detachable bird feeder illustrated in FIGS. 11-12 may be implemented with the connection structure shown in FIGS. 6-8 or with that shown in FIGS. 13-15.

Compared to traditional bird feeders provided in the prior art, the detachable bird feeder of the present disclosure offers the following advantages:

I. The seed tray 1 can be disassembled, whereas in traditional bird feeders, the seed tray 1 and the seed reservoir 2 are welded together and cannot be disassembled for cleaning.

II. The transverse connector 6 is configured to extends transversely through the seed reservoir 2 and, in conjunction with the vertical connector 4, secures the seed reservoir 2 to the seed tray 1. In contrast, traditional bird feeders often employ vertical through-connection, using rope or rod or screw and nut to connect between the seed tray 1 and seed reservoir 2, as well as between the seed reservoir 2 and the top cover 3. In certain models, the rotatable seed tray 1 and the rotatable top cover 3 are designed to secure the bottom and top openings of the seed reservoir 2 by snapping and engaging together at a connection section. This configuration, however, is prone to becoming loose due to rotational movement. There is no transverse configuration employed inside the seed reservoir 2 to provide additional support and reliability. The bird feeder structure is susceptible to getting loose and coming apart when birds feeding from it, particularly when larger birds or squirrels interact with the feeder, causing the unintended detachment and separation of its individual components and resulting in seeds in internal cavity 23 all falling onto the ground. Alternatively, the top cover 3, seed tray 1, and seed reservoir 2 may be interconnected by a single rope or wire penetrating through the bottom of seed tray 1 and the top cover 3, thereby integrating the seed tray 1, seed reservoir 2, and the top cover 3 into a bird feeder and preventing their separation, which also limits the accessibility to clean the internal cavity of the seed reservoir 2 and clean each part of a bird feeder independently.

III. The vertical connector 4 features a distinctive detachable configuration wherein an upper end 42 of the vertical connector 4 detachably engages with the second connecting section 61, which is disposed within the seed reservoir 2 provided on the transverse connector 6. This design facilitates the secure attachment of the seed reservoir 2 to the seed tray 1; at the same time, allows the seed reservoir 2 to be readily accessible for thorough cleaning. Conversely, traditional bird feeders utilize a vertical connector 4 that extends longitudinally through the top cover 3, thereby securing the seed reservoir 2 between the top cover 3 and the seed tray 1, which results in the penetration of the top cover 3. This configuration increases susceptibility to water infiltration into the seed reservoir 2, consequently leading to seed spoilage due to mold.

IV. The second connecting section 61, which secures the seed tray 1 to the seed reservoir 2, is located inside the seed reservoir 2 and is inaccessible for unlocking. There is only one unlocking mechanism, the locking component 55, which serves as the sole unlocking component. The locking component 55 is disposed either within the seed reservoir 2 or at the bottom of the seed tray 1. In practical use, this placement ensures that the locking component 55 is not easily accessible to birds, squirrels, raccoons, or other animals, preventing inadvertent disengagement when these animals attempt to tamper with the feeder. This design ensures the locking component 55 remains secure and enhances the stability and reliability of the connection between the seed tray 1 and the seed reservoir 2, effectively preventing the detachment of the seed tray 1 and ensuring that the bird feeder does not disassemble during use. In traditional bird feeders, there is no internal connection within the seed reservoir 2, and the seed tray 1 and top cover 3 can be loosened, unscrewed, rotated open at the lower openings of the seed reservoir 2, leading to the spillage of seeds from the seed reservoir 2.

In the description of this specification, terms such as "an embodiment", "some embodiments", "examples", "specific examples", or "some example", "implementation" are intended to indicate that the particular features, structures, materials, or characteristics described in connection with that embodiment or example are included in at least one of the embodiments or examples of the present application. Moreover, the specific features, structures, materials, or characteristics described may be combined in any suitable manner in one or more embodiments or examples. Additionally, the features of different embodiments or examples described herein may be combined and integrated by those skilled in the art, provided there are no contradiction.

In addition, the terms "first" and "second" are used for descriptive purposes only, and cannot be construed as indicating or implying relative importance or implicitly indicating the number of technical features indicated. Thus, the features defined with "first" and "second" may explicitly or implicitly include at least one of the features. In the description of the present disclosure, the meaning of "a plurality of" is two or more, unless explicitly and specifically defined otherwise.

The above descriptions are merely specific implementations of the present disclosure, but are not intended to limit the scope of protection of the present disclosure. Any variation or replacement readily figured out by those skilled in the art within the technical scope disclosed in the present disclosure shall fall within the scope of protection of the present disclosure. Therefore, the scope of protection of the present disclosure shall be subject to the scope of protection of the claims.

The invention claimed is:

1. A detachable bird feeder with all parts movable for cleaning independently, comprising:

a seed tray provided with first connecting section, the first connecting section is integrated with the seed tray and relatively unable to rotate;

a seed reservoir, the bottom opening of the seed reservoir resting over the surface of seed tray, and the seed reservoir having a internal cavity, the bottom opening and the top opening, wherein the bottom opening and the top opening each communicate with the internal cavity and facilitate seed flow and thorough cleaning inside the internal cavity, the bottom opening is covered by the seed tray, the bottom opening is connected with the first connecting section, the seed reservoir is provided with a second connecting section, and the second connecting section is located in the internal cavity;

a top cover, the top cover being movably placed over the top opening of the seed reservoir, and the top cover covering the top opening;

a vertical connector, a lower end of the vertical connector being connected to the first connecting section, an upper end of the vertical connector penetrating the second connecting section, and a first threaded section being provided at the upper end of the vertical connector; alternatively, the lower end of the vertical connector penetrating the first connecting section, a second threaded section being provided at the lower end of the vertical connector, and the upper end of the vertical connector being connected to the second connecting section;

a locking component having a first threaded hole, wherein the lower end of the vertical connector is connected to the first connecting section and that the upper end of the vertical connector penetrates the second connecting section, the locking component is located in the internal cavity, the first threaded hole is threaded onto the first threaded section, and the locking component abuts against a side of the second connecting section away from first connecting section.

2. The detachable bird feeder according to claim 1, wherein the detachable bird feeder further comprises:

a transverse connector, wherein a first transverse end of the transverse connector is connected to a first side of two opposing sides of the seed reservoir, a second transverse end of the transverse connector is connected to a second side of two opposing sides of the seed reservoir, and the second connecting section is provided on the transverse connector.

3. The detachable bird feeder according to claim 2, wherein a first connecting hole communicating with the internal cavity is provided on the first side of the opposing sides of the seed reservoir, and a second connecting hole communicating with the internal cavity is provided on the second side of the opposing sides of the seed reservoir;

the first transverse end of the transverse connector penetrates the first connecting hole and is provided with a first limiting portion, the first limiting portion is exposed outside the seed reservoir, and the first limiting portion is able to abut against an outer sidewall of the seed reservoir, so as to prevent the first transverse end of the transverse connector from disengaging from the first connecting hole; and the second transverse end of the transverse connector penetrates the second connecting hole and is provided with a second limiting portion, the second limiting portion is exposed outside the seed reservoir, and the second limiting portion is able to abut against the outer sidewall of the seed reservoir, so as to prevent the second transverse end of the transverse connector from disengaging the second connecting hole.

4. The detachable bird feeder according to claim 3, wherein both of the first limiting portion and the second limiting portion are bent downwards relative to the transverse connector.

5. The detachable bird feeder according to claim 1, wherein Joint Connector are provided on opposite outer sidewalls at the upper end of the seed reservoir;

the top cover rests over the upper end of the seed reservoir, the top cover has a third connecting hole on each of both transverse sides thereof, and the third connecting hole extends through the top cover vertically; and the detachable bird feeder further comprises:

a hanging assemblage, wherein the hanging assemblage is provided with a Hanging section and two third connecting sections, and each of two lower ends of the Hanging section movably penetrates a corresponding third connecting hole, so that the top cover is able to move vertically along the Hanging section, an upper part of the Hanging section is located above the top cover, the upper part of the Hanging section is configured to hang on external support objects that can bear weight, the two third connecting sections are respectively provided at two lower ends of the Hanging section, the third connecting sections are located below the top cover, and the third connecting section is connected to a corresponding Joint Connector to connect the top cover and the seed reservoir together.

6. The detachable bird feeder according to claim 5, wherein the third connecting hole located on both transverse sides of the top cover is provided around the top opening, and the third connecting hole is provided spaced from the top opening.

7. The detachable bird feeder according to claim 5, wherein the Joint Connector has a fourth connecting hole that extends through the Joint Connector vertically; and the third connecting section penetrates the fourth connecting hole and is provided with a third limiting portion, the third limiting portion is disposed obliquely or perpendicularly to the third connecting section, and the third limiting portion is able to abut against a under side of the Joint Connector, so as to prevent the third connecting section from disengaging from the fourth connecting hole.

8. The detachable bird feeder according to claim 1, wherein the upper part of the seed tray has a feeding trough disposed around the bottom opening, the lower end of the seed reservoir has a sidewall with a seed outlet, and the seed outlet communicates with the Feeding trough.

9. The detachable bird feeder according to claim 1, wherein a peripheral wall of the seed reservoir has a feeding port, the feeding port extends through the peripheral wall of the seed reservoir, and the feeding port communicates with the internal cavity.

* * * * *